United States Patent

[11] 3,633,697

| [72] | Inventor | Harry Silver<br>4810 North Los Altos, Tucson, Ariz. 85704 |
|---|---|---|
| [21] | Appl. No. | 861,312 |
| [22] | Filed | Sept. 26, 1969 |
| [45] | Patented | Jan. 11, 1972 |

[54] VEHICLE SAFETY DEVICE
4 Claims, 6 Drawing Figs.

[52] U.S. Cl. .................................................. 180/82,
200/51.07, 280/150 SB, 297/385
[51] Int. Cl. ..................................................... B60r 21/10
[50] Field of Search ............................................ 180/82.8;
280/150 SB; 297/384, 385, 386; 200/51.07, 51.08

[56] References Cited
UNITED STATES PATENTS

| 629,661 | 7/1899 | Clark et al. | 297/384 X |
|---|---|---|---|
| 1,588,120 | 6/1926 | Maijgren | 200/51.08 |
| 2,657,284 | 10/1953 | McGlothlen | 200/51.07 |
| 2,775,288 | 12/1956 | Anastasia | 297/385 |
| 2,868,309 | 1/1959 | Burgess | 180/82.8 |
| 3,154,167 | 10/1964 | Butler et al. | 180/82.8 UX |
| 3,226,674 | 12/1965 | Eriksson | 180/82.8 X |
| 3,374,449 | 3/1968 | Moore et al. | 200/51.07 X |
| 3,494,664 | 2/1970 | States | 297/385 X |

FOREIGN PATENTS

| 1,176,229 | 8/1964 | Germany | 200/51.07 |

Primary Examiner—Benjamin Hersh
Assistant Examiner—John P. Silverstrim
Attorney—Gregory J. Nelson ABSTRACT: A vehicle safety device for use with a motorized vehicle to insure that the driver is in a safe and proper position to operate the vehicle. Interlock switch means are provided in a motive electrical system of the vehicle such as the ignition system. A driver-worn belt is provided having contact means associated therewith which actuate the switch means to complete the motive electrical circuit only when placed under tension by the driver assuming a normal position at the vehicle controls. An alternate embodiment includes a belt with metal inserts which act to restrain the driver by force from an electromagnetic circuit in the vehicle seat.

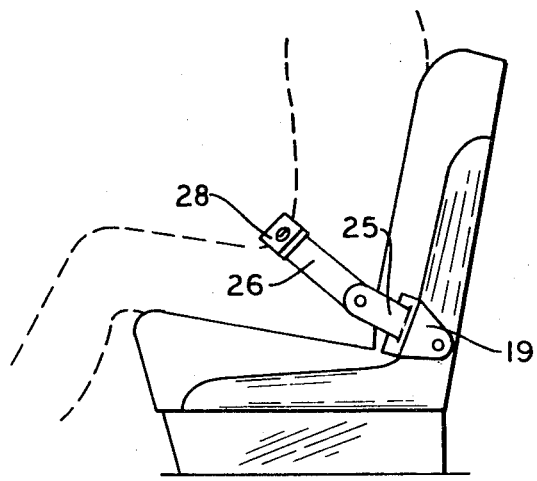
FIG. I
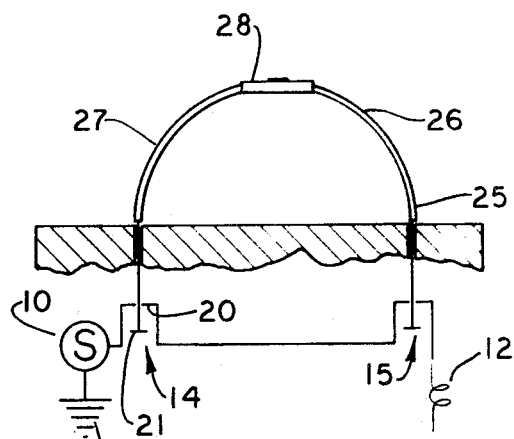
FIG 2
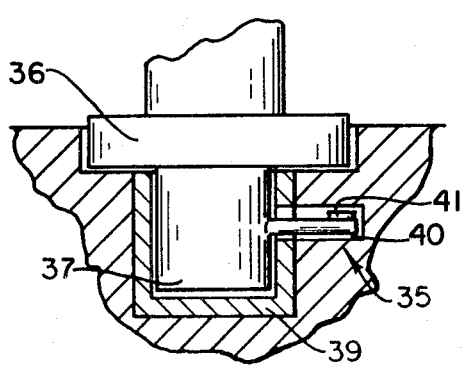
FIG. 3
INVENTOR
HARRY SILVER
ATTORNEY

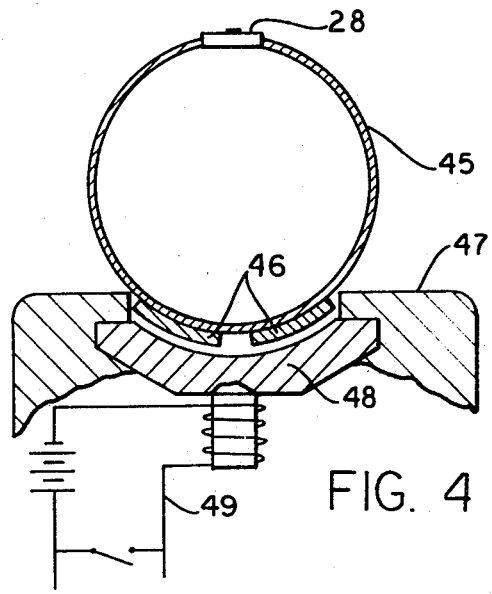
FIG. 4
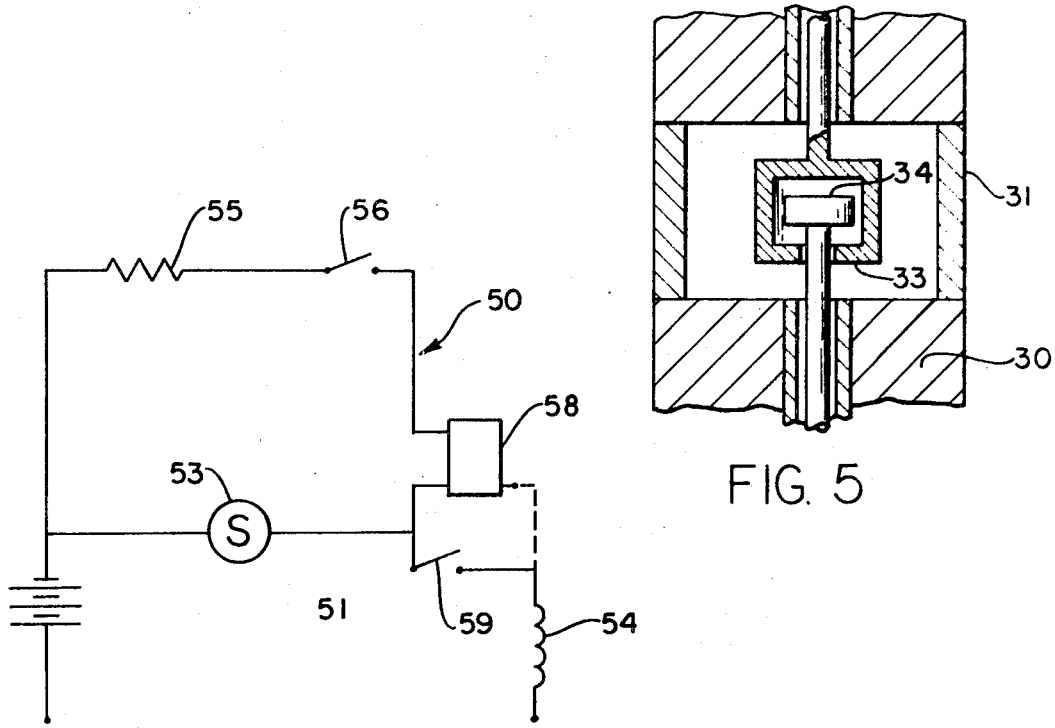
FIG. 5
FIG. 6
INVENTOR
HARRY SILVER
ATTORNEY

VEHICLE SAFETY DEVICE

The present invention relates to a safety device for insuring use of safe practices in operating motorized vehicles of various types. More specifically, this invention relates to a safety arrangement that prevents movement of a vehicle before the vehicle operator is properly seated in the drivers seat.

Proper and safe operation of any motorized vehicle requires that the driver be seated in the drivers seat and further that he be wearing a safety belt. It is known that many vehicle operators, particularly of the delivery class, will drive their vehicles while in a standing position or while not having properly fastened their seatbelts. Drivers often leave their vehicles running while absent, in order to expedite delivery. This is a dangerous practice, both to other drivers and pedestrians as well as to the driver himself.

Therefore, it is a primary object of the present invention to provide a safety arrangement effective to immobilize the vehicle unless the operator is properly seated in the vehicle.

Another broad object of the present invention is to provide a vehicle electrical circuit which cooperates with a belt worn by the driver which insures that the driver is properly seated behind the vehicle controls before the vehicle can be operated.

A more specific object is to provide a driver-worn belt which serves to complete the vehicle ignition circuit only when the operator is safely in his seat with his seatbelt secured and thereby prevents the vehicle from being started until the driver is seated.

Another specific object of the invention is the provision of a driver-worn seatbelt that completes a vehicle motive electrical circuit only when properly fastened and under tension supplied by the driver.

Other objects, advantages, and uses of the present invention will become apparent from reading the following specification and claims taken in connection with the appended drawings wherein:

FIG. 1 is a partial pictorial view showing a vehicle operator wearing the safety belt of the present invention;

FIG. 2 is a circuit schematic diagram showing a vehicle ignition system provided with the safety means of the present invention;

FIG. 3 shows in detail one form of the tension switch of FIG. 2;

FIG. 4 shows an alternate form of the driver-worn belt of the present invention wherein electromagnetic means are used to restrain the driver in the proper position;

FIG. 5 shows in cross-sectional detail still another form of the tension switch wherein the switch is integrated into the seatbelt; and FIG. 6 shows a circuit schematic diagram wherein a separate control circuit is utilized to prevent improper vehicle operation.

Briefly, in one form of my invention, the vehicle operator wears a special seatbelt, described herein. A tension switch secured to the belt controls the vehicle ignition system to insure that the vehicle may be operated only when the driver is properly in place and the belt secured to complete the ignition circuit. Another embodiment includes an electromagnetic circuit which exerts a pull on ferrous metal bars in the special belt to restrain the driver until the ignition is turned off. Various other embodiments are also disclosed herein. Further objects and details of my invention will become apparent as this specification proceeds.

Turning now to FIGS. 1 and 2, a simplified vehicle ignition system is shown connected to the electrical system of the vehicle. The electrical circuit is generally designated as 10, having a power supply 11 connected to the ignition coil 12 through the ignition switch 13. Intermediate the switch 13 and coil 12 in the circuit are two lock switches 14 and 15, which are identical and shown in a position opening the ignition circuit. These switches are conveniently located in receptacles 19 in the vehicle seat on each side of the driver where the driver can reach them with facility. Circuit 10 is electrically connected to terminals 20 provided in each switch. When contacts 21 engages both terminals of the switches, the circuit is complete permitting ignition of the motor vehicle engine. Contacts 21 are formed as part of the ends of extensions 25 of belt 26. Belt 26 is a standard belt, as for example an adjustable seatbelt provided with section 27 which closes at buckle 28. Section 27 could be constructed to encircle the driver's waist. The end of extensions 25 is provided with a catch of standard construction, not shown, which engages receiving portion of receptacle 19. The catch secures the belt while permitting enough movement under tension to permit contact 21 to bridge terminals 20. Referring also to FIG. 2, my invention works as follows: The vehicle driver, prior to making his deliveries, places belt 26 with side extension 25 around him and secures buckle 28. When he assumes a position behind the steering wheel, he places the ends of extensions 25 in the switch receptacles 19 located in the seat as is shown in FIG. 1. The normal tension exerted by the driver on the belt causes contacts 21 to engage terminals 20. When the ignition key is turned, the circuit is completed allowing the engine to start. If for some reason the driver has failed to properly secure the belt, the ignition circuit will be open and the motor will not start until the driver is safely and securely in place. To insure that the driver wears the belt while making his rounds, the driver-encircling portion of the belt 27 could be provided constructed to completely encircle the driver's waist and be provided with a security buckle 28 which could be locked about the driver when he beings his route, with his supervisor maintaining the key.

The safety circuit could also control other motive systems of the vehicle such as brakes or transmission as well as the ignition. For example, the circuit may control a solenoid locking switch which would not release the vehicle brakes until circuit 10 has been properly completed by insertion of the belt.

FIG. 3 shows an alternative form of the tension detection switch which may be used in the system of FIG. 2. In this embodiment the switch 35 is electrically connected in circuit 10. A fitting 36 having a male plug portion 37 is secured to the ends of the belt side extensions 25. Laterally extending from the male plug 37 is retaining pin 38. The receptacle for the plug is provided with a socket 39 for receiving plug 37 and with a slot 40 extending therefrom. A pressure-detecting element 41 within the slot completes the circuit to the ignition when in contact with pin 38. The driver merely inserts fitting 36 into socket 39 located in a convenient place such as the back of the seat. The fitting is twisted, turning retaining pin 38 into slot 40 securing it in place. Tension on belt 25 imposed by the wearer will now place pin 38 and element 41 in contact, completing the ignition circuit through the belt. Release of pressure through the belt or removal of the plug breaks the circuit. The advantage of this type of tension switch is that it provides a positive catch through retaining pin 38, thus giving additional safety features to the driver.

FIG. 4 shows another alternate embodiment of the present invention wherein electromagnetic means are employed to retain the driver in a seated position while motor ignition circuit is actuated.

In this embodiment a variation of the driver-encircling safety belt is used. The driver-worn belt 45 is provided with one or more ferrous metal elements 46 within or attached to the rear of the belt. The back-supporting seat portion 47 of the vehicle contains an electromagnetic bar 48 at a position corresponding to the location of metal elements 46 when the driver is properly seated. The electromagnetic bar 48 is wired into the ignition circuit so that the turning on of the ignition also closes the electromagnetic circuit 49 energizing bar 48. The magnetic force of bar 48 serves to restrain the driver by exerting a force on the metal elements 41. The power supply for the electromagnetic circuit may alternately be a separate source in the vehicle. Again, in the use of this embodiment, the driver's supervisor may wish to insure use of the safety device by securing the belt 45 about the driver at the beginning of the work day.

FIG. 5 shows still another form of the invention wherein the novel device is incorporated into a vehicle seatbelt or strap of the type now in general use. Here the ignition wire 29, included in circuit 10, extends through a seatbelt 30 of generally ordinary construction but having an expandable section 31 of an elastic material. Within this section terminals 33 will be engaged by contact 34 when the belt is stretched under tension by being placed in use about the wearer, allowing current to pass through the ignition or other system. Note that the belt must be subjected to some predetermined tension to close the circuit by making contact at 34, the mere closing of the catch on the seatbelt will not be sufficient to allow the vehicle to be moved. This safety feature insures that the driver is properly seated and has not merely fastened the clasp on an unworn seatbelt.

In FIG. 6 the circuit is shown as an auxiliarly circuit which controls the operation of the vehicle. This circuit may be desirable for safety as it carries only a low current rather than the full ignition current as shown in the embodiment of FIGS. 1 and 2. A standard ignition circuit 51 is shown having the usual battery 52, ignition switch 53, and coil 54. Connected in the circuit between the battery and switch is control circuit 50 which includes resistor 55 and control switch 56 which controls low current relay 58 having normally closed contacts 59 in circuit 51.

Circuit 50 may, for example, be also integrated into a normal seat belt with switch 56 being in an expandable section of the belt. When the belt is being worn and under tension switch 56 is opened. This cuts off the current to relay 58 causing contacts 58 to "make" completing the ignition circuit. The resister 55 reduces the current in auxiliary circuit 50 to a safe level which would not endanger the driver if integrated into the seatbelt.

It will be obvious that an integrated switch as shown in FIG. 5 may be used at 56. In this case, since tension on the belt closes the contacts, relay 58 would be normally open and would be caused to close when switch 56 is closed.

It will be seen from the foregoing that I have described a simple and effective means of insuring that delivery and other vehicles are operated in the proper manner with regard to good safety practice. To this end I propose the use of a vehicle operator worn belt that must be in place about the driver while the driver is in a sitting position before the vehicle can be started.

It will be obvious to those skilled in the art to make various modifications to the invention herein disclosed; however, to the extent that such modifications and changes do not depart from the spirit of the invention, they are intended to be included in the scope thereof, which is not limited to the embodiments specifically illustrated in the drawings but rather only by a just and fair interpretation of the claims.

Having fully described my invention with sufficient clarity so that those skilled in the art may construct and use it, I claim:

1. In a vehicle having an operator's seat and a motive electrical circuit which must be completed prior to starting the vehicle, a safety device comprising:
   safety belt means adapted to be worn about the operator and provided with locking means at both ends of the belt;
   receptacle means adapted to releasably receive said locking means, said receptacle being mounted adjacent both sides of the operator when he assumes a normal seated operating position; and
   switch means in said circuit, said switch means including contact means located in at least one of said receptacles, and said locking means including means closing said contact means only when said locking means are inserted in said receptacle and said belt is placed in tension by proper use about the operator.

2. The device of claim 1 further including additional contact means integral in said belt which are caused to close and complete said motive circuit only when the belt is placed in tension.

3. The device of claim 1 wherein said safety belt includes a section which completely encircles the driver's waist and is closable by a lockable security clasp whereby the belt can be clasped about the driver to insure its use and further including straps oppositely extending from the encircling belt position, the end of said straps being provided with said releasable locking means.

4. The device of claim 1 wherein said electrical circuit is the vehicle ignition circuit and the means cooperating with said belt comprise switch means which actuate said circuit permitting mobilization of the vehicle only when said driver is properly positioned wearing said belt.

* * * * *